United States Patent [19]

Bouhelier et al.

[11] Patent Number: 4,553,223
[45] Date of Patent: Nov. 12, 1985

[54] STATIC DISTURBANCE SIGNAL RECORDING SYSTEM HAVING DETACHABLE PROGRAMMING TERMINAL & PROGRAMMABLE FIXED PART WITH SELECTIVELY POWERED BUFFER MEMORY

[75] Inventors: Francis Bouhelier; Claude Vialatte, both of Paris, France

[73] Assignee: Thomson CSF, Paris, France

[21] Appl. No.: 395,313

[22] Filed: Jul. 6, 1982

[30] Foreign Application Priority Data

Jul. 17, 1981 [FR] France .................... 81 13977

[51] Int. Cl.[4] .............. G06F 3/00; G06F 11/30; G06F 15/16; G06F 15/20
[52] U.S. Cl. .................... 364/900; 364/420; 364/422; 364/518; 364/551; 324/113; 324/111
[58] Field of Search ... 364/200 MS File, 900 MS File, 364/571, 415, 417, 420–422, 550, 551, 518; 324/51, 113, 111, 112; 128/709, 710

[56] References Cited

U.S. PATENT DOCUMENTS

| Re. 31,222 | 4/1983 | McCracken | 364/571 |
|---|---|---|---|
| 4,161,782 | 7/1979 | McCracken | 364/571 |
| 4,216,462 | 8/1980 | McGrath et al. | 340/150 |
| 4,350,979 | 9/1982 | Eberwein | 340/861 |
| 4,356,475 | 10/1982 | Neumann et al. | 340/521 |
| 4,361,877 | 11/1982 | Dyer et al. | 364/900 |
| 4,365,290 | 12/1982 | Nelms | 364/200 |
| 4,369,497 | 1/1983 | Poupon et al. | 364/422 |
| 4,375,663 | 3/1983 | Arcara et al. | 364/200 |
| 4,388,706 | 6/1983 | Butler | 365/226 |
| 4,398,272 | 8/1983 | Sibert | 367/33 |
| 4,399,513 | 8/1983 | Sullivan et al. | 364/551 |
| 4,417,306 | 11/1983 | Citron et al. | 364/415 |
| 4,430,653 | 2/1984 | Coon et al. | 343/5 NA |

OTHER PUBLICATIONS

R. Allen, *Microcomputer Assistance in Clinical Monitoring of Intracranial Pressure*, Medical & Biological Engineering & Computing (May 1981) pp. 349–355.

*Primary Examiner*—Raulfe B. Zache
*Assistant Examiner*—Archie E. Williams, Jr.
*Attorney, Agent, or Firm*—Cushman, Darby & Cushman

[57] ABSTRACT

The system includes a basic recorder module where a delay element is followed by a solid state buffer memory, digital interface circuits for transferring the recorded data, processing means, a printer and/or magnetic memory unit, a detachable programming terminal for the dialogue with the recorder and its programming, as well as a separate power supply for the working part, so that the latter is only supplied in the recording mode or during a connection of the programming terminal.

10 Claims, 6 Drawing Figures

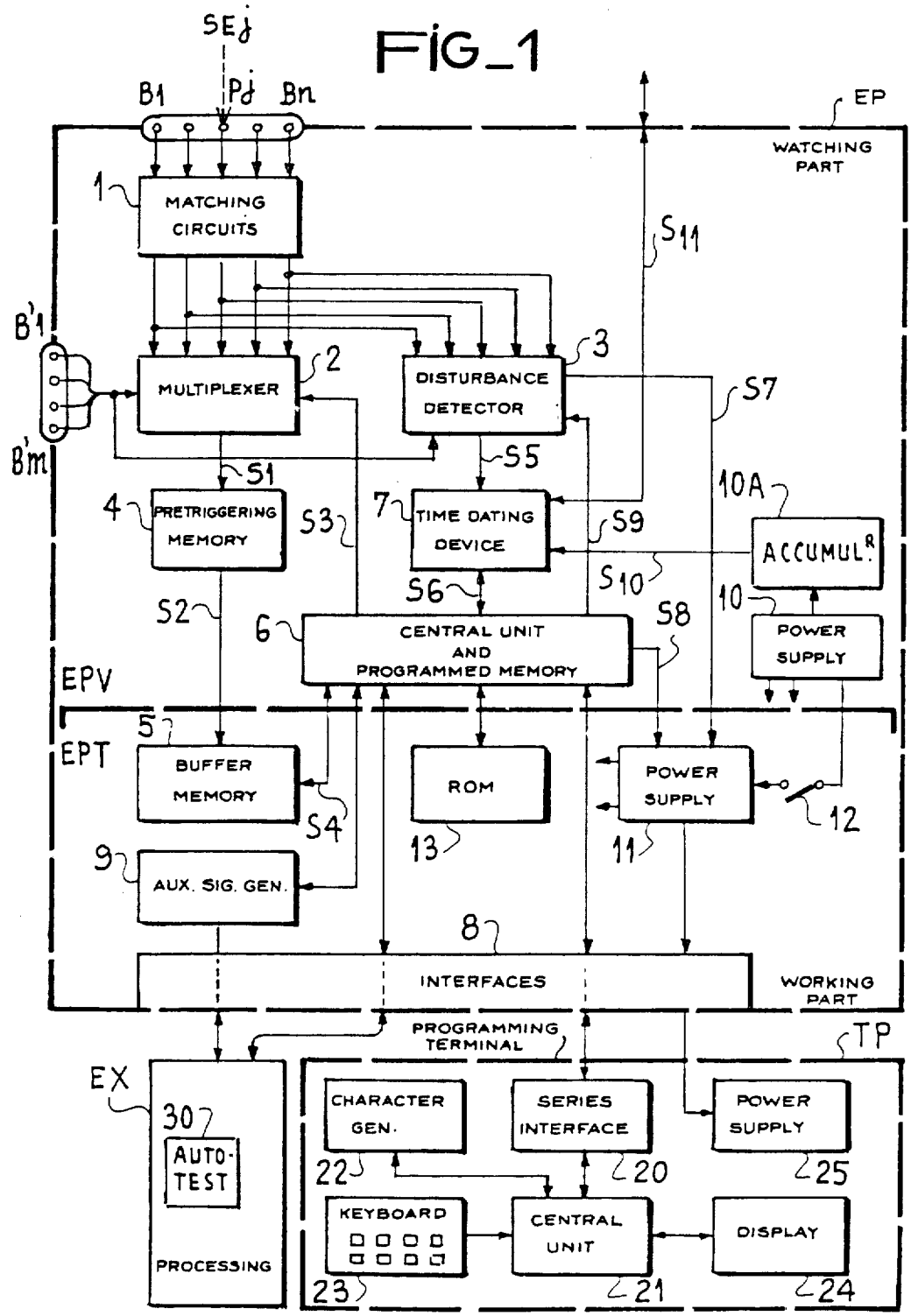

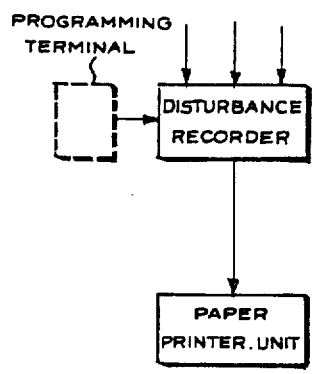
FIG_2
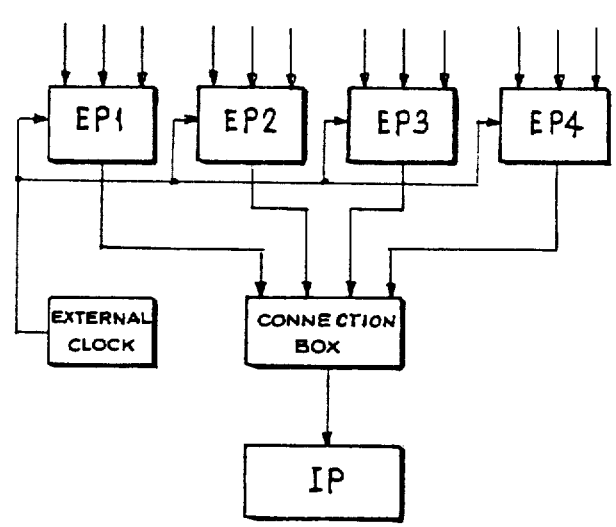
FIG_3
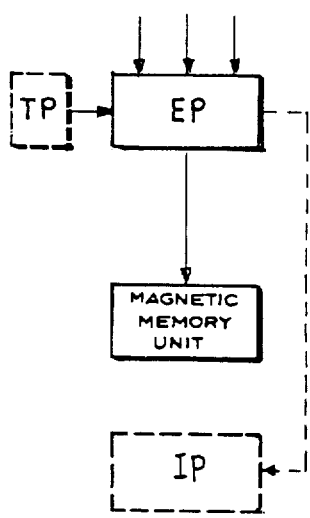
FIG_4
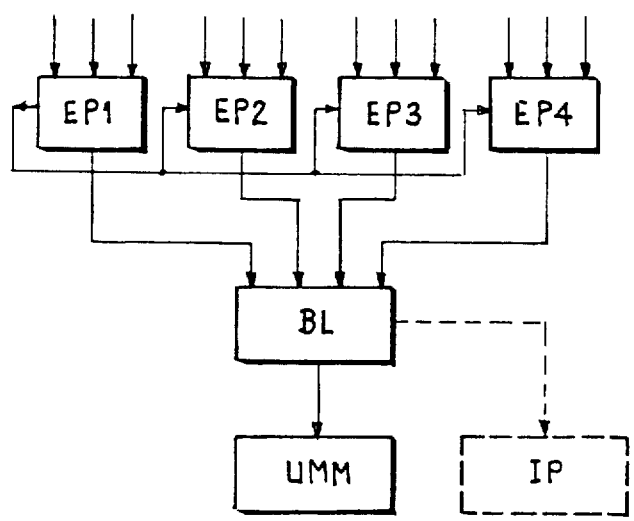
FIG_5

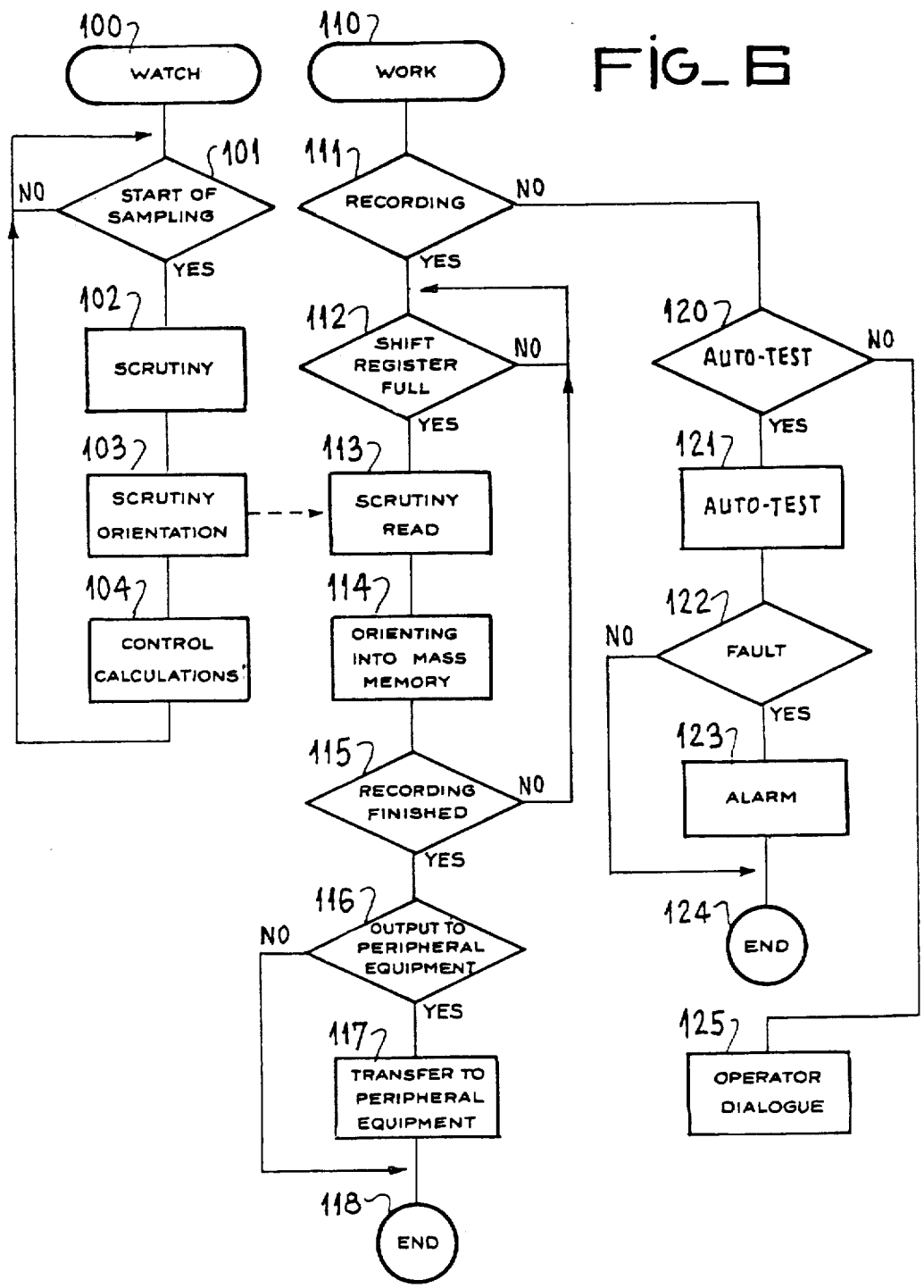

STATIC DISTURBANCE SIGNAL RECORDING SYSTEM HAVING DETACHABLE PROGRAMMING TERMINAL & PROGRAMMABLE FIXED PART WITH SELECTIVELY POWERED BUFFER MEMORY

BACKGROUND OF THE INVENTION

The present invention relates to disturbance signal recorders, also called fault recorders. These devices have two characteristic operating modes, namely a watching mode during which only electrical input signals are monitored, and a recording mode during which the electrical input signals are effectively recorded. The start of recording is generally a few tenths of a second before the appearance of the disturbance or trouble in order to subsequently make it possible to obtain details of the complete history thereof.

There are two main types of disturbance signal recorders, namely electromechanical and electronic recorders, but the present invention relates to the latter type.

According to a first known embodiment falling in this category, an electronic device producing a time lag or delay is inserted upstream of the device for writing on paper, which uses optical galvanometers, a halogen lamp and a photosensitive paper. For this purpose electrical input signals, after undergoing analog-digital conversion, pass through the delay device or pretriggering memory or store formed with the aid of a shift register and are then reconverted into analog signals for application to the galvanometers. This solution has a number of disadvantages due essentially to the writing devices used. Galvanometers with halogen lamps are expensive and the fact that they are constantly supplied with power is prejudicial to their reliability. In addition, the need to periodically replace the roll of paper used leads to high operating costs. Finally, the photosensitive paper of the writing or recording device has a poor storage life, both before and after use.

According to a second known solution, certain of these disadvantages are obviated by using a conventional writing or recording device having styli, so that costs are reduced and the paper has a good life. However, the stylus recorder has a reduced pass band of approximately 30 Hz at the most and for reproducing signals with a higher frequency a device is provided for slowing down the signals to make them compatible with the stylus recorder. This device is constituted by a solid state electronic memory, which is inserted between the shift register, i.e. the pretriggering memory, and digital-analog reconversion circuits. A disadvantage of the stylus recording device is the difficulty of reproducing in a simple manner and at the same time as the input signals, the date information necessary for processing the recordings.

In addition, these two solutions have two important deficiencies. The first is the need of systematically replacing the roll of paper and the second is the lack of flexibility of the information support, a diagram on paper not really being suitable for automatic analysis and digital processing without the use of a human operator.

A third solution obviating the aforementioned difficulties is described in French Patent Application 2,429,998. The useful input signals are recorded on a flexible disk magnetic memory inserted between the shift register constituting the so-called pretriggering memory and the digital-analog conversion circuits preceding a recorder on paper. The capacity of the disk memory is equivalent to several rolls of paper. Thus, the size of this memory makes it possible to considerably reduce the frequency with which the rolls of paper are replaced. If the writing or recording device is detachable, the operator can transport it with him and reproduce on the paper the recordings of the day of his or her visit.

The disadvantages of this latter electronic solution are mainly in the type of memory used, the latter forming an integral part of the recording chain. For certain applications, such as the monitoring of electric power transmission lines in tropical countries, the characteristics of the flexible disks (temperature range for use 5° to 45° C., permitted relative humidity 20 to 80%) may prove inadequate. Moreover, a breakdown in the flexible disk memory automatically leads to a failure of the recorder which, from then on, is no longer able to collect new information.

BRIEF SUMMARY OF THE INVENTION

One object of the present invention is to provide a disturbance signal recorder system eliminating the disadvantages of the preceding solutions, while offering the advantages of each of them. In particular the system uses a buffer memory having a relatively large capacity, which can work in combination with an economic writing or recording device permitting both alphanumeric entries (dating and identification) and graphic entries on a paper which is stable before and after use.

As can be gathered from the following description, the system also provides specific advantages, the most important being programmability of characteristics, easy remote transmission of data and comparibility with automatic analysis and digital processing means, great flexibility permitting combinations with high-performance peripheral modules, high reliability due to the use of static components and low electric power consumption when operating in the watching mode.

The present invention therefore provides a disturbance signal recorder system comprising a fixed part, called the disturbance signal recorder installed at a recording point and set up so as to receive electric signals to be monitored and record disturbance, a separate complementary part comprising recorded data processing means, and electrical connection means between the two parts, the interfering signal recorder comprising, connected in series, means for the reception and matching of electrical input signals, analog-digital conversion and multiplexing means, a first or so-called pretriggering memory for producing a delay and a second memory for recording disturbance, the recorder also comprising means for the detection of disturbance supplied by the reception and matching means, a time dating device, control and management means having a central unit for checking the conversion and multiplexing means and for controlling the recording in the second memory, and auxiliary signal generator circuits, wherein the second memory is a semiconductor buffer memory having a predetermined capacity for a storage of data to be subsequently transmitted to the processing part, said disturbance signal recorder also incorporating separate supply means for supplying the buffer memory and the auxiliary signal generator solely when disturbance or trouble is occurring, dialogue and programming means in the form of a detachable device, digital interface circuits constituting the said connection means between on the one hand the recorder and the processing means and between on the other the recorder and the dialog and programming device.

BRIEF DESCRIPTION OF THE DRAWINGS

The invention is described in greater detail hereinafter relative to non-limitative embodiments and the attached drawings, wherein show:

FIG. 1 a block diagram of an disturbance signal recorder system according to the invention.

FIG. 2 a diagram of a first modular embodiment corresponding to the system of FIG. 1.

FIG. 3 a diagram of a second modular embodiment which includes several fixed stations connected to a single exploitation unit.

FIG. 4 a diagram of a third modular embodiment as in FIG. 2 and which utilizes a peripheral magnetic memory.

FIG. 5 a diagram of a fourth modular embodiment as in FIG. 4 and which utilizes a peripheral magnetic memory.

FIG. 6 a flowchart of a system according to the invention.

DETAILED DESCRIPTION OF THE PREFERRED EMBODIMENTS

A disturbance signal trouble recorder system according to the invention comprises several assemblies or modules. These can be subdivided into a first part installed as a fixed station at a recording point and which constitutes the basic module or disturbance signal recorder EP, whose function is to monitor the electric input signals and record possible disturbance in a solid state memory forming a buffer. There is also a second partex, which can be installed in the vicinity of recorder EP or at a distance therefrom. The second part may be built in accordance with a centralized processing device for use by several interfering signal recorders EP. This second part EX can be constructed in various ways and essentially comprises means for processing data recorded in module EP. Processing part EX can be realized by means of a paper printer IP or can incorporate a memory unit UM, as will be shown hereinafter.

In FIG. 1 the disturbance signal recorder system is represented by its essential components, namely the actual recorder EP, the processing circuits EX and a programming terminal TP. The original construction of recorder EP ensures the high degree of flexibility of the system.

Recorder EP incorporates connection means for the reception of input signals to be monitored. Connection takes place on terminals B1 to Bn able to receive up to n input signals SE1 to SEn. The input terminals are connected to a group of matching circuits 1, which are connected to the channels for which matching is provided (matching of level, pass band, etc.).

The signals leaving unit 1 are transmitted on the one hand to analog/digital conversion and multiplexing circuits 2 and on the other to disturbance signal detection circuits 3.

The conversion into digital form of the signals received in analog form can be carried out before or after multiplexing. In the latter case it is merely necessary to have a single conversion circuit, but the reliability of the system is better with the first option. Obviously the system can also receive signals in digital form, which are directly transmitted to the multiplexing circuits 2, as well as to the detection circuits 3. The digital signals are received at terminals B'1 to B'm.

In the case of analog signals, the detection circuits 3 operate by threshold comparisons, filtering or other procedures for the purpose of detecting specific disturbances, which can be in the form of an amplitude variation, a frequency variation or a variation of some other characteristic parameter of the corresponding input signal. In the case of digital signals, the detection of interference is based on the detection of the changed state of one or more inputs.

The multiplexing output S1 is transmitted to a pre-triggering memory 4 of the shift register type to introduce a given delay which makes it possible, during the detection of interference by circuit 3, to record in a downstream circuit the position prior to the disturbance for a given time which is essentially equivalent to the said delay, e.g. of approximately a few tenths of a second. Memory 4 is connected by its output S2 to a second memory 5 for recording disturbance.

A circuit 6 processes the control and synchronization signals S3 relative to conversion and multiplexing circuits 2. By link S4 it controls the recording of disturbances and to this end one output S5 of circuit 3 is transmitted to circuit 6 across a time dating device 7.

The time dating device 7 serves to supply a very precise dating, e.g. to within one thousandth of a second for each disturbance signal or the like. This information, as well as the date, is transmitted by link S6 to circuit 6 to be recorded in the second memory 5 at the head of each recording in the form of an identifier containing in digital form all the information for the subsequent processing of the data, namely the characteristics of the position and apparatus where the recording was carried out, together with the date and duration thereof.

Time dating device 7 uses circuits having a low electrical power consumption, e.g. of C/MOS technology. An accumulator 10A permanently charged by power supply 10 is used as an emergency supply for time dating device 7 via link S10 in the case of a temporary interruption of the general power supply 10. Link S11 connects the time dating device to the outside to enable it to receive or transmit synchronizing signals. The latter can come from an external clock HX (FIG. 3) or some other recorder EP (FIG. 5) and can be passed to one of several other recorders EP.

Circuit 6 comprises a central unit and associated circuits 2 for forming a microprocessor or microcomputer. Therefore it is also provided with variable input and program memories, constant data memories and bus links with the input/output circuits. Its structure is of a conventional nature and reference can be made in this connection e.g. to the document published by the MOTOROLA company entitled: "M 6800 Microcomputer System Design Data".

Central unit 6 controls the writing into memory 5 and subsequently the reading of the memory for transmitting the data to the processing means across interface circuits 8.

Thus, a first feature of the system results from the fact that the external links of recorder EP take place by digital interface circuits. There is no digital-analog reconversion at the output of the second memory. The connection between recorder EP and processing means EX can be in the form of a standard digital link, e.g. of the RS232 type. This arrangement, which renders superfluous a demultiplexing operation and a digital-analog reconversion operation, also has the advantage of "scratching" the output signals, thus making it possible to connect numerous ancillary devices particularly of the informatics type to the recorder EP.

The disturbance signal recorder EP also comprises in per se known manner, so-called auxiliary circuits 9 for processing service signals indicating e.g. by the closing of a relay contact that recording is taking place or for controlling the making live of the ancillary equipment for receiving the data. These service signals are transmitted to the outside in digital form across interface circuits 8.

A second feature of the recorder is that solid state memory 5 is a static memory instead of being dynomic such as a disk or tape memory. Semiconductor memory 5 has an average capacity which can be e.g. about 10 seconds of recording. In fact it forms a buffer memory between the recorder and the external analysis and processing means EX.

According to a third feature of the system, recorder EP is subdivided into two parts, namely a constantly supplied watching part EPV and a working part EPT, which only receives power in the recording mode. In actual fact part of EPT is also supplied when recorder EP is used with programming terminal TP, in the manner described hereinafter. This is brought about by means of separate supplies for each of the parts, power supply 10 relating to the watching part and rendering live the circuits involved in this part as soon as the recorder is started up. The second power supply 11 relating to the working part EPT is only triggered by output S7 of detector 3 during the detection of interference in order to render live the circuits of the working part. Following a corresponding recording through the buffer memory 5 the central unit, via link S8, controls the stopping of the power supply of the working part by circuit 11. However, a manual control 12 makes it possible for the working part EPT to be made live by the operator during the use of the programming terminal TP. Working part EPT incorporates the second or buffer memory 5, auxiliary circuits 9, interface circuits 8, as well as a programmed read-only memory 13, which is used by the bias of the central unit 6 during dialogue with recorder EP by means of programming terminal TP. It should also be noted that central unit 6 can form part of the working part EPT by means of the use of a second central unit in the watching part ensuring the control links S3 to the conversion and multiplexing circuits 2 and S9 to the detector circuits 3. Link S9 makes it possible for central unit 6 to interrogate circuit 3 in order to obtain information on the origin of the triggering process and can then place this information in the identifier at the head of the recording.

When a second central unit or a small microprocessor is used, said second unit is obviously connected to the central unit located in the working part.

As a result of the subdivision of recorder EP into two separate and entirely static parts, whereof only the watching part is constantly live, the average absorbed part is greatly reduced and reliability is high. For information, the power can be below 20 Watts.

A fourth feature of the system is the possibility of programming certain of its characteristics, such as the pass band, the sensitivity, the duration of the recordings, and the service identifications, which makes it possible to use it for developing the recordings according to the particular needs. This results from the use of a conventional programming terminal TP constituted by a portable terminal having the size of a pocket calculator and which can therefore be easily transported. In the same recorder EP, terminal TP comprises a central unit 21 whose programmes can evolve. It is connected to digital interface links at 8 and makes it possible to produce all the controls and programming, while permitting a dialogue between the operator and the recorder EP as a result of the alphanumeric display on terminal TP. Thus, the interfering signal recorder EP can be designed with a box or case having substantially no manual controls on the front face, which makes it possible to greatly cut down costs. The dialogue and programming by the bias of terminal TP are made possible as a result of central unit 6 which, in the read-only memory 13 programmed for this purpose, can convert the dialogue of the informatics type into dialogue which can be easily interpreted by a not specially trained operator. The ROM 13 is the equivalent of a dictionary and can be changed when the language of the operator changes. For information purposes it is pointed out that the essential components of programming terminal TP are a series interface 20, central unit 21, a character generator 22, keyboard 23 and a display 24, apart from a power supply 25, which is controlled from power supply 11, which is started up by closing contact door 12. The latter can also be brought into the closed position by the mechanical locking or engagement of the connection of the programming terminal.

The disturbance signal recorder EP can be combined with a printer IP constituting the processing circuits EX, so as to reproduce on paper the elements stored in buffer 5. As shown in FIG. 2, printer IP can be of any random type, provided that it can operate both in the graphic mode for plotting curves and in the alphanumeric mode for entering data and other data and provided that it can be remotely started up (i.e. made live by control of recorder EP). Thus, it is possible to use a thermal, electrosensitive, optical fibre cathode ray tube or laser printer which the user can choose as a function of requirements. The arrangement does not suffer from the disadvantage of loss of monitoring in the case of the paper ending or the printer failing. Thus, memory 5 generally has an adequate capacity to be able to await the arrival of the operator, while being ready to store any other possible recordings. Programming terminal TP is shown in dotted line form, because it is normally transported by the operator and is not involved in the normal operation of the recorder.

FIG. 3 shows a variant of the proceding combination in which several disturbance recorders EP1, EP2, etc. are combined with a single printer IP by the bias of a connection box BL serving as a multiplexing circuit, in such a way that dialogue is successively possible with the different recorders EP1, EP2, etc. connected by their synchronizing inputs/outputs to an external clock HX.

The constructions according to FIGS. 2 or 3 involve an operator moving or replacing the roll of paper. This can be disadvantageous when movements are restricted, so that recorder EP according to FIG. 4 or recorders EP1, EP2, etc. according to FIG. 5 are connected (across a connecting circuit BL in the latter option) to a magnetic memory or store, whose capacity can be very high, e.g. several thousand seconds. This amounts to introducing a third memory in the data chain, namely unit UMM, whose capacity is much higher than that of buffer memory 5. The user is able to choose the most suitable magnetic memory unit for his requirements, as a function of the sought capacity and the environmental conditions. This is obviously particularly advantageous in the case of remote connection concepts, when the management of one or, in general, several interfering signal recorders is centralized. In this case it is necessary to combine with recorder EP a supplementary interface component adapted to the remote connection mode (telephone lines, high voltage lines, optical fibres, radio links, etc.), whereby this component can be e.g. a modulator-demodulator in the case of a telephone link. Units UMM can be of the flexible disk or magnetic tape type, said two supports being detachable, or it is also possible to use memory units of the fixed disk, magnetic bubble or other types. In each of these cases the operator can program recorder EP in such a way that when the memory support is full in magnetic memory unit UMM, it erases the oldest recordings and replaces them by more recent recordings.

In the arrangements of FIGS. 4 or 5, which use a magnetic memory unit UMM, a printer IP is indicated by dotted lines and it is possible to reproduce on the latter the recording when this is desired by the operator. Printer IP can be carried to the location by the operator at the same time as terminal TP. By means of the central unit 6 of recorder EP or one of them (case of FIG. 5), the operator transfers data from the magnetic memory unit UMM to printer IP. In the described arrangements incorporating one or more recorders EP, it should be noted that decisions are centralized by the recorder and not by the associated peripheral equipment. As by definition disturbance is of a random nature, it can intervene during a dialogue or a data transmission. The central unit 6 is programmed in such a way that the recording function has an absolute priority and the central unit interrupts the link between the recorder and its peripheral equipment when this is necessary.

It should also be noted that a test of satisfactory operation can be required by central unit 6 of recorder EP in connection with the peripheral equipment before or after each use or in a periodic manner, in order to check that the system is ready to operate. This test is received by the recorder in the form of a digital state word and is analyzed by central unit 6 and can lead to the operator being called, when a fault is detected. This call takes place by means of auxiliary circuits 9. The operator then has access to the state word characterizing the fault by using programming terminal TP. For information purposes auto-test circuits 30 are shown in the processing part of FIG. 1, said circuits serving to supply the digital state word corresponding to the satisfactory operation test on interrogation of the central unit 6. Circuits 30 can be designed in per se known manner and reference can be made in this connection to the document "Preliminary OEM Manual for a Floppy disk controller published by Scientific Micro Systems 777 East Middlefield Road, Mountain View, Calif. 94043 - published Dec. 9, 1977". With regards to the magnetic memory unit UMM, reference can be made e.g. to the document "EX 801-820 Printers User Manual", published by AXIOM, April 1979.

FIG. 6 shows a flow chart of a disturbance signal recording system according to the invention. The vertical, left-hand diagram relates to the testing and operations of the watching part EPV. Stage 100 corresponds to the initialization of part EPV, i.e. to it being made live. Test stage 101 represents the wait from sampling control S3 processed by the central unit or a microprocessor 6. This is followed by the cyclic scrutinization or scanning operation 102, i.e. the sampling of signals by multiplexer at 2 on periodic control by signal S3. The following operation 103 is the orientation of the digital result S1 of the scrutinization into the pretriggering memory 4. The digital data are entered in memory 4 in place of the oldest data previously there. The oldest data are then either eliminated, or transmitted to the buffer memory 5, as will be shown hereinafter during the analysis of the diagram EPT. Stage 104 corresponds to control calculations performed by the central unit for making the sampling frequency dependent on the fluctuations of the signal frequency to be checked, in such a way that substantially the same samples of the considered signal are selected during the successive cycles thereof. This operation makes it possible to prepare the sampled signals for subsequent processing by compression reserved for the signals resulting from interference and therefore, said processing is only performed in working part EPT. Operation 104 results from the programming of central unit 6. The result of the control calculations influences the sampling frequency given by control signal S3.

The central diagram relates to the test and operations of the working part EPT. Initialization in 110 is controlled by signal S7 which releases power supply 11. Stage 111 represents the recording cause test, which can result from disturbance detection (to 112) or an auto-test control (to 121) or an operator dialogue request (to 125). In the case of disturbance detection, the corresponding signal is S6 received by central unit 6. Stage 112 is the test controlled by unit 6 of the state of memory 4, whether or not the latter is full. If it is not full, filling continues. If it is full, operation 113 consisting of reading the oldest data stored in 4 takes place. Stage 114 is the operation of orienting said data (after processing by possible compression) into mass memory 5. Test 115 corresponds to the end of recording in memory 5, i.e. the end of the disturbance to be recorded. It is possible here to have several different operating types and, for each of them, a predetermined recording time as a function of the preprogrammed rules. Test 116 corresponds to a programmed output to a peripheral device and stage 117, in the affirmative, to the transfer operation to a magnetic memory unit UMM or external printer IP. Stage 118 is the end of recording.

The right-hand diagram shows at 120 the test cause of the initialization of the EPT in the absence of disturbance.. Stage 121 represents the auto-test operation triggered by circuit 30 of the processing part. It can also represent a periodic test and automatic operation, programmed by central unit 6 and initiated by a signal from the time dating device 7. Fault test 122 means that central unit 6 interprets the test results and determines whether or not there is a fault. In the affirmative, the unit triggers off the alarm operation 123 by circuit 9 to the outside. Stage 124 is the end of this sequence.

The final stage 125 represents an activation of the EPT from programming terminal TP, i.e. the operator dialogue operation.

An disturbance signal recording system according to the invention provides the user with economic means, as a result of its optimized design, and modular structure compatible with all conventional informatics means for recording electric signals with random recurrences, such as disturbance occurring in the transmission of electric power. As a result of its digital design it is possible to remotely transmit data and directly process magnetic supports recorded by conventional informatics means. However, its use is not limited to the monitoring of electricity systems. The system can be used in research laboratories, the iron and steel industry (e.g. power supply for furnaces), the medical field (monitoring patients), computer power supplies, chemical industry, as well as the generation or conversion of energy.

What is claimed is:

1. A disturbance signal recording system comprising: a fixed unit located at a point suitable for detecting a disturbance, said fixed unit including:
   (a) processing signal means for continuously receiving input signals and outputting corresponding digital signals;
   (b) pretriggering memory means for receiving and delaying said digital signals received from said processing signal means;
   (c) disturbance detector means for receiving said digital signals from said processing signal means and detecting which ones of said digital signals are disturbance signals, said disturbance detector means outputting first and second control signals at the beginning of each detected disturbance signal and a third control signal at the end of each detected disturbance signal;
   (d) solid state buffer memory means for recording, from said pretriggering memory, said ones of said digital signals which have been detected to be disturbance signals by said disturbance detection means, said recording occurring in response to a record control signal;
   (e) programmable control means for receiving said first and third control signals from said disturbance detector means and in response to said first control signal issuing said record control signal to said buffer memory means and in response to said third control signal issuing a power cut-off signal;
   (f) first power supply means for continuously supplying power to said processing signal means, said pretriggering memory means, said disturbance detector means and said programmable control means; and
   (g) second power supply means for supplying power to said buffer memory means in response to said second control signal from said disturbance detector means and for cutting off power to said buffer memory means in response to said power cut-off signal from said programmable control means;

a peripheral unit including a storage recording means for recording said disturbance signals recorded in said buffer memory means, and a detachable programming terminal, including a control display unit, for programming said programmable control means; and digital interface means for linking said fixed unit and said peripheral unit;

wherein said programmable control means reads said disturbance signals recorded in said buffer memory means and transmits said read disturbance signals via said digital interface means to said peripheral unit for recording in said storage recording means.

2. A system according to claim 1, wherein said fixed unit comprises:

a monitoring area continuously energized by said first power supply means and a recording area energized and deenergized by said second power supply means in response to said second and third control signals, respectively;

said monitoring area including: said processing signal means which includes analog-digital conversion and multiplexing circuits for feeding said digital signals to said disturbance detection means and to said pretriggering memory means; said disturbance detection means; said pretriggering memory means; said programmable control means; a time dating device connected between said disturbance detection means and said programmable control means for supplying a precise dating to each of said disturbance signals detected by said disturbance detection means and said first power supply;

said recording area including: said buffer memory; said digital interface means; and said second power supply.

3. A system according to claim 2, wherein said recording area also comprises a read-only memory for operating in conjunction with said programming terminal via said programmable control means.

4. A system according to claim 3, wherein the programmable control means comprises a first processor in said monitoring area, which is continuously energized to control and synchronize the analog-digital conversion and multiplexing circuits, as well as the disturbance detection means and the time dating device, and a second processor in said recording area for controlling said buffer memory means and said read-only memory, said second processor being controlled by said first processor.

5. A system according to any one of claims 3, 4 1 or 2 wherein said storage recording means comprises a paper printer adapted to receive and print digital data in a graphic mode and in an alphanumeric mode.

6. A system according to claim 5, comprising a plurality of said fixed units connected across a connecting and multiplexing box to said storage recording unit, wherein said plurality of fixed units are synchronized with one another or on the basis of a common external clock.

7. A system according to any one of claims 3, 4, 1 or 2 wherein the storage recording means comprises a magnetic memory unit for a large capacity storage of successive disturbance data provided from the buffer memory means.

8. A system according to claim 7, wherein the storage recording means also comprises a paper printing unit adapted to receive and print digital data in a graphic mode and in an alphanumeric mode.

9. A system according to claim 8, comprising a plurality of said fixed units connected across a connecting and multiplexing box to the magnetic memory unit and to the paper printing unit.

10. A system according to any one of claims 3, 4, 1 or 2 comprising an emergency power supply for the time dating device, said supply being constituted by an accumulator charged by said first power supply.

* * * * *